United States Patent
Kai et al.

(10) Patent No.: US 8,446,680 B2
(45) Date of Patent: May 21, 2013

(54) ZOOM LENS AND IMAGING APPARATUS

(75) Inventors: Hideki Kai, Kanagawa (JP); Makoto Kanai, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/445,555

(22) Filed: Apr. 12, 2012

(65) Prior Publication Data

US 2012/0307129 A1 Dec. 6, 2012

(30) Foreign Application Priority Data

Jun. 6, 2011 (JP) ................................. 2011-126681

(51) Int. Cl.
*G02B 15/14* (2006.01)
*G02B 15/15* (2006.01)

(52) U.S. Cl.
USPC .......................................... 359/687; 359/677

(58) Field of Classification Search
USPC .................. 359/676, 677, 686, 687
See application file for complete search history.

(56) References Cited

FOREIGN PATENT DOCUMENTS

| JP | 2005-049843 | 2/2005 |
|---|---|---|
| JP | 2007-133138 | 5/2007 |

*Primary Examiner* — Jack Dinh
(74) *Attorney, Agent, or Firm* — Rader, Fishman & Grauer PLLC

(57) ABSTRACT

A zoom lens includes a first lens group having positive refractive power, a second lens group having negative refractive power, a third lens group having positive refractive power, and a fourth lens group having positive refractive power, the first, second, third, and fourth lens groups being arranged in order from an object side, and satisfies conditional expression (1) and conditional expression (2) below, (1) $0.95<|fw12|/fw<1.2$ and (2) $140<f1/\beta t234<150$, where, fw12 denotes a synthetic focal length of the first lens group and the second lens group at a wide-angle end, fw denotes a focal length of a whole lens system at the wide-angle end, f1 denotes the focal length of the first lens group, and $\beta t234$ denotes the synthetic magnification of the second lens group, the third lens group, and the fourth lens group at a telephoto end.

6 Claims, 10 Drawing Sheets

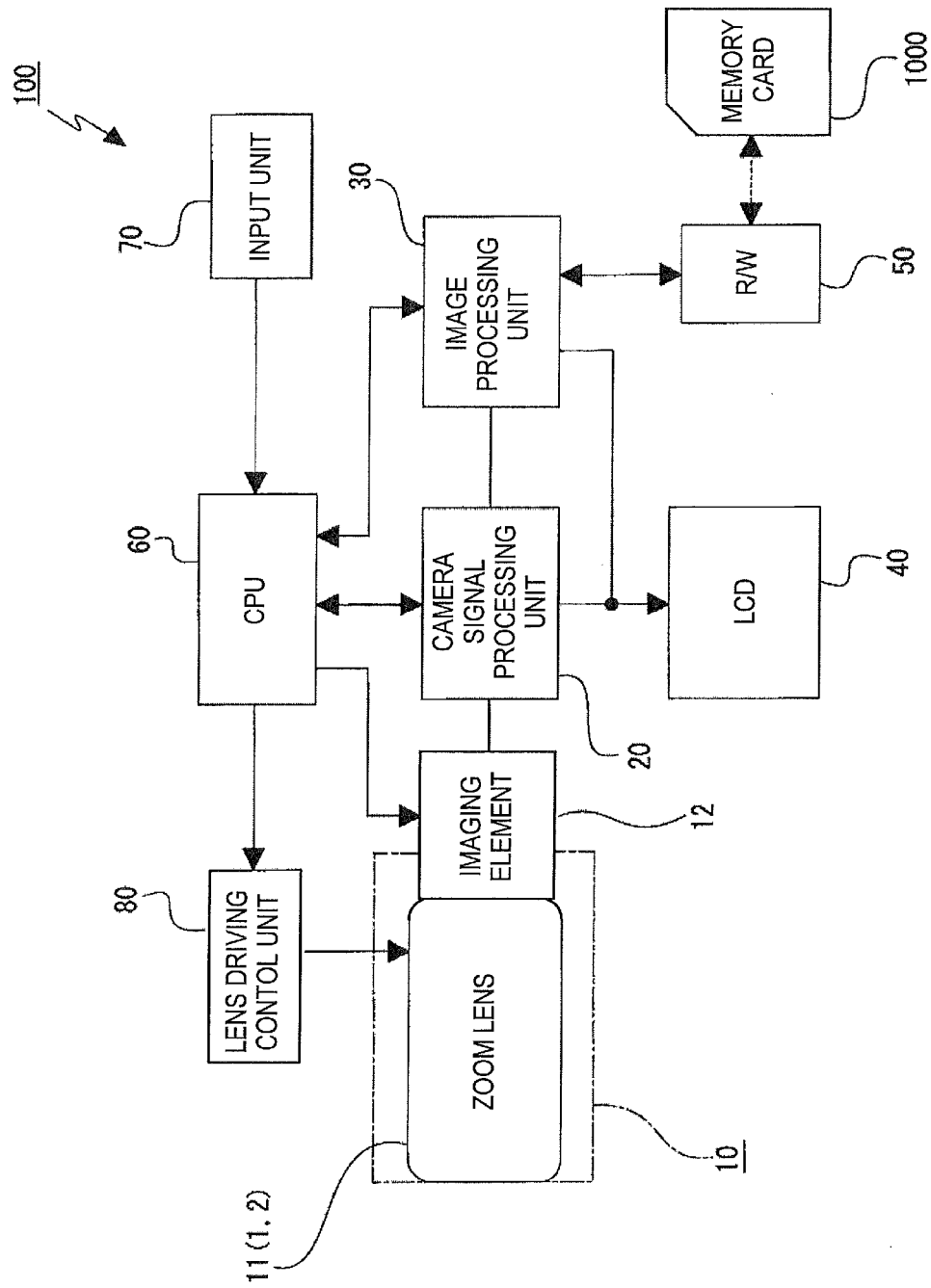

ZOOM LENS AND IMAGING APPARATUS

BACKGROUND

The present technology relates to a zoom lens and an imaging apparatus, and particularly, to a technology field of a zoom lens and an imaging apparatus which are appropriately used in an interchangeable lens mountable in a digital single-lens reflex camera and can be manufactured in a small size with high performance even when an angle of view at a wide-angle end, for example, exceeds 80°.

In the related art, a method in which an imaging apparatus such as a camera uses an imaging element having a photoelectric conversion element such as a charge coupled device (CCD) or a complementary metal-oxide semiconductor (CMOS), converts a light amount of an object image formed on an imaging element surface into electrical output by the photoelectric conversion element, and records the object image has been disclosed.

In recent years, as the number of pixels of an imaging element is increased with the advance of technology and recording of a high spatial frequency is possible, a lens with high performance is also required for an optical system. Furthermore, as user needs are diversified and demands for the selection of an optimal lens according to an object or a photographing location increase, a zoom lens, specifically, a zoom lens for an interchangeable lens, is becoming more important.

Therefore, demands for a zoom lens having a high F-number and a wide angle are also increasing. In order to satisfy these demands, a minus lead-type optical system in which a negative lens group is arranged in a first lens group has been proposed (for example, refer to Japanese Unexamined Patent Application Publication No. 2005-49843).

Meanwhile, in recent years, with the improvement of processing accuracy or mass productivity, an aspherical lens has been generally used, and a plus lead-type optical system in which a positive lens group is arranged in a first lens group has been proposed (for example, refer to Japanese Unexamined Patent Application Publication No. 2007-133138). According to this proposal, the plus lead-type zoom lens has a wide angle and can be manufactured in a small size.

SUMMARY

In the minus lead-type optical system disclosed in Japanese Unexamined Patent Application Publication No. 2005-49843, it is possible to ensure a wide angle and sufficient back focus. However, since the total optical length at a wide-angle end is increased, the diameter and weight of a lens nearest an object side are increased.

Furthermore, in the plus lead-type optical system disclosed in Japanese Unexamined Patent Application Publication No. 2007-133138, it is possible to achieve a wide angle and reduce the total lens length. However, if an angle of view at a wide-angle end, for example, exceeds 80°, since it is more necessary to ensure a wide angle and sufficient back focus, the total lens length and the diameter of an optical filter are increased.

In light of the foregoing, a zoom lens and an imaging apparatus of the present technology overcome the above-mentioned problems and can be manufactured in a small size with high performance even when an angle of view at a wide-angle end is large, for example, exceeds 80°.

In order to solve the problem above, according to a first embodiment of the present disclosure, there is provided a zoom lens including a first lens group having positive refractive power, a second lens group having negative refractive power, a third lens group having positive refractive power, and a fourth lens group having positive refractive power, the first lens group, the second lens group, the third lens group, and the fourth lens group being arranged in order from an object side. When a positional state of a lens is changed from a wide-angle end to a telephoto end, an interval between the first lens group and the second lens group is increased, an interval between the second lens group and the third lens group is decreased, an interval between the third lens group and the fourth lens group is decreased, an aperture stop is arranged between the second lens group and the third lens group, and the second lens group moves in close range focusing, and the zoom lens satisfies conditional expression (1) and conditional expression (2) below, (1) $0.95 < |fw12|/fw < 1.2$ (2) $140 < f1/\beta t234 < 150$ where, in conditional expression (1) and conditional expression (2), $fw12$ denotes a synthetic focal length of the first lens group and the second lens group at a wide-angle end, $fw$ denotes a focal length of a whole lens system at the wide-angle end, $f1$ denotes a focal length of the first lens group, and $\beta t234$ denotes synthetic magnification of the second lens group, the third lens group, and the fourth lens group at a telephoto end.

Therefore, according to the zoom lens, a synthesized refractive power of the first lens group and the second lens group at the wide-angle end, a refractive power of the first lens group at a telephoto end, and the synthetic magnification of the second lens group, a third lens group, and a fourth lens group are made appropriate.

According to a second embodiment of the present disclosure, as for the zoom lens above, the first lens group includes one negative lens and two positive lenses, and the zoom lens satisfies conditional expression (3) $Nd1 > 1.75$. In conditional expression (3), $Nd1$ denotes a refractive index of the two positive lenses of the first lens group.

As for the zoom lens above, the first lens group includes one negative lens and two positive lenses and the zoom lens satisfies conditional expression (3), so that light incident on the first lens group is greatly refracted.

According to a third embodiment of the present disclosure, the third lens group includes a positive lens, a positive lens, and a negative lens, which are arranged in order from the object side, and the zoom lens satisfies conditional expression (4) $TL3/TLw < 0.095$, and in conditional expression (4), $TL3$ denotes a thickness of the third lens group, and $TLw$ denotes a total optical length at the wide-angle end.

The third lens group includes a positive lens, a positive lens, and a negative lens arranged in order from an object side, and the zoom lens satisfies conditional expression (4), so that a principal point of the third lens group is positioned at the object side.

According to a fourth embodiment of the present disclosure, as for the zoom lens above, the zoom lens satisfies conditional expression (5) $0.0 < (R3r - R4f)/(R3r + R4f) < 0.55$. In conditional expression (5), $R3r$ denotes a curvature radius of a surface facing an image side and arranged nearest the image side in the third lens group, and $R4f$ denotes a curvature radius of a surface facing the object side and arranged nearest the object side in the fourth lens group.

The zoom lens satisfies conditional expression (5), so that a light flux emitted from the third lens group diverges and can be incident on the fourth lens group while the high height of a light beam is maintained to be high.

According to a fifth embodiment of the present disclosure, as for the zoom lens above, the zoom lens satisfies conditional expression (6) $4 \leq 2 - \beta w34 - 1/\beta w34 < 4.1$ where, in conditional expression (6), βw34 denotes synthetic magnification of the third lens group and the fourth lens group at the wide-angle end.

The zoom lens satisfies conditional expression (6), so that the synthetic magnification of the third lens group and the fourth lens group has a value approximate to the same magnification.

In order to solve the problem above, an imaging apparatus includes a zoom lens, and an imaging element configured to convert an optical image formed by the zoom lens into an electrical signal. The zoom lens includes a first lens group having positive refractive power, a second lens group having negative refractive power, a third lens group having positive refractive power, and a fourth lens group having positive refractive power, the first lens group, the second lens group, the third lens group, and the fourth lens group being arranged in order from an object side, and when a positional state of a lens is changed from a wide-angle end to a telephoto end, an interval between the first lens group and the second lens group is increased, an interval between the second lens group and the third lens group is decreased, an interval between the third lens group and the fourth lens group is decreased, an aperture stop is arranged between the second lens group and the third lens group, and the second lens group moves to close range focusing, and the zoom lens satisfies conditional expression (1) $0.95<|fw12|/fw<1.2$ and conditional expression (2) $140<f1/\beta t234<150$. In conditional expression (1) and conditional expression (2), fw12 denotes a synthetic focal length of the first lens group and the second lens group at a wide-angle end, fw denotes a focal length of a whole lens system at the wide-angle end, f1 denotes a focal length of the first lens group, and βt234 denotes synthetic magnification of the second lens group, the third lens group, and the fourth lens group at a telephoto end.

Consequently, according to the imaging apparatus, in the zoom lens, the synthesized refractive power of the first lens group and the second lens group at the wide-angle end, the refractive power of the first lens group at the telephoto end, and the synthetic magnification of the second lens group, the third lens group, and the fourth lens group are made appropriate.

The zoom lens and the imaging apparatus of the present technology can be manufactured in a small size with high performance even when an angle of view at a wide-angle end is large, for example, exceeds 80°.

DETAILED DESCRIPTION OF THE EMBODIMENT(S)

Hereinafter, preferred embodiments of the present technology will be described in detail with reference to the appended drawings. Note that, in this specification and the appended drawings, structural elements that have substantially the same function and structure are denoted with the same reference numerals, and repeated explanation of these structural elements is omitted.

Hereinafter, a zoom lens and an imaging apparatus of the present technology according to a preferable embodiment will be described.

[Configuration of Zoom Lens]

The zoom lens of the present technology includes a first lens group having a positive refractive power, a second lens group having a negative refractive power, a third lens group having a positive refractive power, and a fourth lens group having a positive refractive power, which are arranged in order form an object side.

Furthermore, according to the zoom lens of the present technology, when a positional state of a lens is changed from a wide-angle end to a telephoto end, an interval between the first lens group and the second lens group is increased, an interval between the second lens group and the third lens group is decreased, an interval between the third lens group and the fourth lens group is decreased, an aperture stop is arranged between the second lens group and the third lens group, and the second lens group moves in close range focusing.

According to the zoom lens of the present technology, in a wide-angle end state, since the first lens group and the second lens group are arranged adjacent to each other and a synthetic focal length of the two lens groups has a negative value, it is possible to regard the first lens group and the second lens group as one negative lens group. In the same manner, since both the third lens group and the fourth lens group are positive lens groups and a synthetic focal length of the two lens groups has a positive value, it is possible to regard the third lens group and the fourth lens group as one positive lens group.

Thus, the zoom lens of the present technology is a negative•positive retrofocus type zoom lens in which lens groups are arranged in order from an object side to an image side in the wide-angle end state, and has a configuration optimal to a wide angle of view. Furthermore, in the wide-angle end state, the interval between the second lens group and the third lens group is increased, so that an off-axis light flux passing through the second lens group passes through a place separated from an optical axis, and thus it is possible to correct an on-axis light flux independent of the off-axis light flux.

According to the zoom lens of the present technology, in a telephoto end state, the interval between the first lens group and the second lens group is increased. Furthermore, in the telephoto end state, the interval between the second lens group and the third lens group and the interval between the third lens group and the fourth lens group are reduced, so that the second lens group, the third lens group, and the fourth lens group are adjacent to one another. Since a synthetic focal length of the three lens groups has a positive value, it is possible to regard the second lens group, the third lens group, and the fourth lens group as one positive lens group.

Thus, the zoom lens of the present technology has a positive•positive group configuration in which lens groups are arranged in order from the object side to the image side in the telephoto end state, and has a group configuration that is suitable when the telephoto end is approximate to a standard angle of view.

Furthermore, in the telephoto end state, since the interval between the second lens group and the third lens group is reduced, the off-axis light flux passing through the second lens group passes through a place adjacent to the optical axis.

As described above, the refractive power arrangement of each group and a change in the lens position are optimized, so that it is possible to achieve a desired optical system. Furthermore, the height of the off-axis light flux passing through the second lens group is changed, so that off-axis aberration occurring due to a change in the lens position is successfully corrected. In the zoom lens of the present technology, specifically, the configuration of the second lens group is important for aberration correction.

The zoom lens of the present technology is configured to satisfy conditional expression (1) and conditional expression (2) below.

$$0.95<|fw12|/fw<1.2 \qquad (1)$$

$$140<f1/\beta t234<150 \qquad (2)$$

In conditional expression (1) and conditional expression (2), fw12 denotes the synthetic focal length of the first lens group and the second lens group at the wide-angle end, fw denotes a focal length of the whole lens system at the wide-angle end, f1 denotes the focal length of the first lens group, and βt234 denotes the synthetic magnification of the second lens group, the third lens group, and the fourth lens group at the telephoto end.

Conditional expression (1) relates to the synthetic focal length of the first lens group and the second lens group at the wide-angle end with respect to the focal length of the whole lens system at the wide-angle end.

If the lower limit of conditional expression (1) is not reached, the synthesized refractive power of the first lens group and the second lens group at the wide-angle end is increased, so that it is possible to reduce the diameter of an optical filter and the total optical length. However, comma aberration may be increased or eccentricity sensitivity may be increased.

Meanwhile, if the upper limit of conditional expression (1) is reached, the synthesized refractive power of the first lens group and the second lens group at the wide-angle end is reduced, so that the diameter of the optical filter may be increased and the total optical length may be increased.

Consequently, the zoom lens satisfies conditional expression (1), so that the synthesized refractive power of the first lens group and the second lens group at the wide-angle end is made appropriate, and thus it is possible to reduce the diameter of the optical filter and the total optical length and to decrease comma aberration or eccentricity sensitivity.

Conditional expression (2) defines the ratio of the focal length of the first lens group at the telephoto end with respect to the synthetic magnification of the second lens group, the third lens group, and the fourth lens group.

If the lower limit of conditional expression (2) is not reached, since the refractive power of the first lens group is increased or the synthetic magnification of the second lens group, the third lens group, and the fourth lens group at the telephoto end is increased, eccentricity sensitivity may be increased and optical performance may be significantly reduced due to mutual eccentricity occurring at the time of manufacturing.

Meanwhile, if the upper limit of conditional expression (2) is reached, since the refractive power of the first lens group at the telephoto end is reduced or the synthetic magnification of the second lens group, the third lens group, and the fourth lens group at the telephoto end is reduced, a problem may occur in optical specifications, for example, the diameter of the first lens group may be increased, or it may not be possible to ensure a focal length required at the telephoto end.

Consequently, the zoom lens satisfies conditional expression (2), so that the refractive power of the first lens group at the telephoto end and the synthetic magnification of the second lens group, the third lens group, and the fourth lens group are made appropriate, and thus it is possible to improve optical performance through a reduction of eccentricity sensitivity and to reduce the diameter of the first lens group.

It is preferable that the zoom lens of the present technology satisfy the following condition (I) to condition (IV). (I) A positive lens of the first lens group uses a high refractive material. (II) The third lens group includes three lenses including a positive first lens, a positive second lens, and a negative third lens arranged in order from the object side. (III) A negative lens having a concave surface facing the image side is arranged nearest the image side in the third lens group, and a positive lens having a convex surface facing the object side is arranged nearest the object side in the fourth lens group. (IV) The synthetic magnification of the third lens group and the fourth lens group has a value approximate to the same magnification at the wide-angle end.

Condition (I) is a condition for reducing the size of the first lens group and reducing aberration occurring in the first lens group.

A high refractive material is used in the positive lens of the first lens group, so that a light beam incident on the first lens group can be greatly refracted, resulting in the reduction of the size of the first lens group.

Furthermore, as compared with the case in which a low refractive material is used in the positive lens of the first lens group, since it is not necessary to reduce a curvature radius of a lens in order to refract an incident light beam, it is possible to reduce aberration occurring when the light beam passes the first lens group.

Condition (II) is a condition for reducing the total optical length.

In a configuration in which a light flux converged by the first lens group (a positive lens group) is diverged by the second lens group (a negative lens group), if the principal point of the third lens group is positioned at an image surface side, it is difficult to reduce the total optical length.

In this regard, the third lens group is allowed to have a configuration in which a positive lens and a negative lens are arranged in order from the object side to the image side, so that it is possible to reduce the total optical length by allowing the principal point of the third lens group to be positioned at the object side. Furthermore, two positive lenses are arranged, so that it is possible to successfully correct on-axis aberration.

Condition (III) is a condition for maintaining the height of a light beam in a large diameter lens.

In the large diameter lens, in order to ensure a light amount, it is necessary to form an image at a predetermined position while maintaining the height of the light beam to be high.

In this regard, in the third lens group, a concave surface facing the image side is arranged nearest the image side, so that a light flux emitted from the third lens group is diverged and can be incident on the fourth lens group while maintaining the height of the light beam to be high. Furthermore, in the fourth lens group, a convex surface facing the object side is arranged nearest the object side, so that the light flux emitted from the third lens group is converged after being incident on the fourth lens group, and an image can be formed on an imaging surface while maintaining a predetermined light amount (an F number).

Condition (IV) is a condition for reducing the total length from an aperture stop to an image surface at the wide-angle end.

The synthetic magnification of the third lens group and the fourth lens group is allowed to have a value approximate to the same magnification (β=−1), so that it is possible to reduce the total length from the aperture stop to the imaging surface at the wide-angle end by reducing a conjugation length in the third lens group and the fourth lens group.

According to the zoom lens in accordance with the embodiment of the present technology, the first lens group includes one negative lens and two positive lenses, and it is preferable to satisfy conditional expression (3) below.

$$Nd1 > 1.75 \qquad (3)$$

In conditional expression (3), Nd1 denotes a refractive index of the two positive lenses of the first lens group.

Conditional expression (3) defines condition (I) using detailed numerical values.

Conditional expression (3) is satisfied, so that it is possible to reduce the lens diameter of the first lens group and reduce the occurrence of aberration in the first lens group.

According to the zoom lens in accordance with the embodiment of the present technology, the third lens group includes a positive lens and a positive lens arranged in order from the object side to the image side, and it is preferable to satisfy conditional expression (4) below.

$$TL3/TLw<0.095 \tag{4}$$

In conditional expression (4), TL3 denotes the thickness of the third lens group, and TLw denotes the total optical length at the wide-angle end.

Conditional expression (4) defines the ratio of the thickness of the third lens group with respect to the total optical length at the wide-angle end, and is based on condition (II).

According to the zoom lens, in order to achieve optical performance sufficient for a large diameter lens, it is effective for three lenses (a positive lens, a positive lens, and a negative lens) to be arranged in order from the object side to the image side. Furthermore, conditional expression (4) is satisfied, so that it is possible to achieve a lens configuration in which the total optical length is short, and to successfully correct on-axis aberration.

If the upper limit of conditional expression (4) is reached, it is difficult to reduce the size of the third lens group because the total length of the wide-angle end is increased.

According to the zoom lens in accordance with the embodiment of the present technology, it is preferable to satisfy conditional expression (5) below.

$$0.0<(R3r-R4f)/(R3r+R4f)<0.55 \tag{5}$$

In conditional expression (5), R3r denotes a curvature radius of the surface facing the image side and arranged nearest the image side in the third lens group, and R4f denotes a curvature radius of the surface facing the object side and arranged nearest the object side in the fourth lens group.

Conditional expression (5) is based on condition (III), and defines a relation between the curvature radius of the surface facing the image side and arranged nearest the image side in the third lens group and the curvature radius of the surface facing the object side and arranged nearest the object side in the fourth lens group.

If the upper limit of conditional expression (5) is reached, since the curvature radius of the surface facing the object side and arranged nearest the object side in the fourth lens group with respect to the curvature radius of the surface facing the image side and arranged nearest the image side in the third lens group is excessively small, comma aberration is not successfully corrected and eccentricity sensitivity between the third lens group and the fourth lens group is increased, so that optical performance may be significantly reduced by mutual eccentricity occurring at the time of manufacturing.

Meanwhile, if the lower limit of conditional expression (5) is not reached, since the curvature radius of the surface facing the object side and arranged nearest the object side in the fourth lens group with respect to the curvature radius of the surface facing the image side and arranged nearest the image side in the third lens group is excessively large, it is not possible to successfully correct aberration and spherical aberration and comma aberration around a screen may occur.

Consequently, conditional expression (5) is satisfied, so that it is possible to improve optical performance by successfully correcting each aberration.

According to the zoom lens in accordance with the embodiment of the present technology, it is preferable to satisfy conditional expression (6) below.

$$4 \leq 2-\beta w34-1/\beta w34<4.1 \tag{6}$$

In conditional expression (6), βw34 denotes the synthetic magnification of the third lens group and the fourth lens group at the wide-angle end.

Conditional expression (6) defines condition (IV) using detailed numerical values.

Conditional expression (6) is satisfied, so that it is possible to minimize the distance from the aperture stop to the imaging surface at the wide-angle end, and to reduce the total optical length.

[Numerical Value Embodiment of Zoom Lens]

Hereinafter, a detailed embodiment of the zoom lens according to the present technology and numerical value embodiments, in which detailed numerical values are applied to the embodiment, will be described with reference to the drawings and tables.

The meaning and the like of marks in the following tables or description are as follows.

"Si" denotes a surface number of an $i^{th}$ surface counted from the object side to the image side, "Ri" denotes a paraxial curvature radius of the $i^{th}$ surface, "Di" denotes an axial surface distance (the thickness of the center of a lens or air spacing) between the $i^{th}$ surface and an $(i+1)^{th}$ surface, "Nd" denotes a refractive index in a d line ($\lambda$=587.6 nm) of a lens and the like starting from the $i^{th}$ surface, and "vd" denotes the Abbe number in the d line of the lens and the like starting from the $i^{th}$ surface.

In relation to "Si," "ASP" denotes that a corresponding surface is an aspherical surface. In relation to "Ri," "Inf" denotes that a corresponding surface is flat. In relation to "Di," "BF" denotes back focus.

"κ" denotes a conic constant, and "A," "B," "C," "D," and "E" denote fourth, sixth, eighth, tenth, and twelfth order aspheric coefficients, respectively.

"f" denotes a focal length, "Fno" denotes an F number, and "2ω" denotes an angle of view.

In the following tables indicating aspheric coefficients, "E-n" denotes an exponential expression with base 10, that is, denotes "$10^{-n}$." For example, "0.12345E-05" denotes "$0.12345 \times 10^{-5}$."

In the zoom lens used in each embodiment, a lens surface may be formed with an aspherical surface. An aspheric shape is defined by the following Equation 1 if "x" denotes the distance (an amount of sag) in the optical axis direction from an apex of a lens surface, "y" denotes the height (the image height) in the direction perpendicular to the optical axis direction, "c" denotes a paraxial curvature radius (a reciprocal of a curvature radius) at the apex of the lens, "κ" denotes a conic constant, and "A," "B," "C," "D," and "E" denote fourth, sixth, eighth, tenth, and twelfth order aspheric coefficients, respectively.

$$x = \frac{cy^2}{1+\{1-(1+k)c^2 y^2\}^{1/2}} + Ay^4 + By^6 + \dots \qquad \text{Equation 1}$$

FIG. 1 is a diagram of refractive power distribution of the zoom lens according to each embodiment of the present technology. In each embodiment, a first lens group GR1 having positive refractive power, a second lens group GR2 having negative refractive power, a third lens group GR3 having positive refractive power, and a fourth lens group GR4 having positive refractive power are arranged in order from an object side to an image side.

In each embodiment, when the positional state of lenses is changed from a wide-angle end to a telephoto end, an interval between the first lens group GR1 and the second lens group GR2 is increased, an interval between the second lens group GR2 and the third lens group GR3 is decreased, and an interval between the third lens group GR3 and the fourth lens group GR4 is decreased. At this time, the second lens group GR2 moves to close range focusing.

FIG. 2 and FIG. 6 illustrate the lens configurations of a zoom lens 1 and a zoom lens 2 according to a first embodiment and a second embodiment of the zoom lens of the present technology, respectively.

In FIG. 2 and FIG. 6, an upper stage indicates the positions of lenses at a wide-angle end state (W), an intermediate stage indicates the positions of lenses at an intermediate focal length state (M), and a lower stage indicates the positions of lenses at a telephoto end state (T).

<First Embodiment>

FIG. 2 illustrates the lens configuration of the zoom lens 1 according to the first embodiment of the present technology.

In the zoom lens 1, the first lens group GR1 having positive refractive power, the second lens group GR2 having negative refractive power, the third lens group GR3 having positive refractive power, and the fourth lens group GR4 having positive refractive power are arranged in order from an object side to an image side.

The zoom lens 1 has a variable power ratio of 2.94.

The first lens group GR1 has a configuration in which a cemented lens, which is formed by joining a meniscus negative lens G1, whose convex surface faces the object side, to a biconvex positive lens G2, and a meniscus positive lens G3, whose convex surface faces the object side, are arranged in order from the object side to the image side.

The second lens group GR2 has a configuration in which a meniscus negative lens G4, whose convex surface faces the object side, a biconcave negative lens G5, a biconvex positive lens G6, and a cemented lens, which is formed by joining a biconcave negative lens G7 to a biconvex positive lens G8, are arranged in order from the object side to the image side. The negative lens G4 has a compound aspherical surface.

The third lens group GR3 has a configuration in which a biconvex positive lens G9, a meniscus positive lens G10, whose convex surface faces the object side, and a biconcave negative lens G11 are arranged in order from the object side to the image side.

The fourth lens group GR4 has a configuration in which a biconvex positive lens G12, a biconcave negative lens G13, a cemented lens formed by joining a biconcave negative lens G14 to a biconvex positive lens G15, and a biconvex positive lens G15 are arranged in order from the object side to the image side. The negative lens G13 has a compound aspherical surface.

A filter (not illustrated) and a cover glass (not illustrated) are arranged in order from the object side to the image side between the fourth lens group GR4 and an image surface IMG.

An aperture stop S is arranged adjacent to the object side of the third lens group GR3 between the second lens group GR2 and the third lens group GR3, and moves together with the third lens group GR3.

Table 1 below illustrates lens data of numerical value embodiment 1 in which detailed numerical values are applied to the zoom lens 1 according to the first embodiment.

TABLE 1

| Si | Ri | Di | Nd | νd |
|---|---|---|---|---|
| 1 | 546.110 | 1.50 | 1.84666 | 23.7 |
| 2 | 87.316 | 6.50 | 1.80420 | 46.5 |
| 3 | −1328.700 | 0.15 | | |
| 4 | 46.384 | 4.98 | 1.80420 | 46.5 |
| 5 | 107.566 | (D5) | | |
| 6 (ASP) | 94.010 | 0.20 | 1.53420 | 41.7 |
| 7 | 50.611 | 0.90 | 1.91082 | 35.2 |
| 8 | 14.013 | 7.27 | | |
| 9 | −37.640 | 1.00 | 1.88300 | 40.8 |
| 10 | 52.394 | 0.30 | | |
| 11 | 34.200 | 4.50 | 1.64769 | 33.8 |
| 12 | −34.200 | 2.19 | | |
| 13 | −16.454 | 0.90 | 1.77250 | 49.6 |
| 14 | 126.010 | 3.10 | 1.84666 | 23.8 |
| 15 | −34.252 | (D15) | | |
| 16 | inf | 1.30 | | |
| 17 | 42.385 | 4.29 | 1.80611 | 40.7 |
| 18 | −58.895 | 0.20 | | |
| 19 | 32.060 | 3.62 | 1.49700 | 81.6 |
| 20 | 341.362 | 2.49 | | |
| 21 | −38.864 | 1.00 | 1.83481 | 42.7 |
| 22 | 43.518 | (D22) | | |
| 23 | 26.197 | 7.00 | 1.49700 | 81.6 |
| 24 | −38.110 | 0.50 | | |
| 25 | −379.680 | 2.00 | 1.90366 | 31.3 |
| 26 | 80.008 | 0.30 | 1.53420 | 41.7 |
| 27 (ASP) | 231.713 | 2.45 | | |
| 28 | −79.730 | 0.90 | 1.84666 | 23.8 |
| 29 | 40.000 | 5.02 | 1.49700 | 81.6 |
| 30 | −49.830 | 0.20 | | |
| 31 | 122.570 | 4.75 | 1.62004 | 36.3 |
| 32 | −31.834 | (BF) | | |

In the zoom lens 1, surfaces (sixth surfaces) of the negative lens G4 of the second lens group GR2, which face the object side, and surfaces (twenty-seventh surfaces) of the negative lens G13 of the fourth lens group GR4, which face the image side, are formed with aspherical surfaces. In numerical value embodiment 1, Table 2 below illustrates the fourth, sixth, eighth, tenth, and twelfth order aspheric coefficients A, B, C, D, and E of aspherical surfaces together with the conic constant κ.

TABLE 2

| | S6 | S27 |
|---|---|---|
| κ | 4.4 | 0.00000E+00 |
| A | 2.35559E−05 | 3.58853E−05 |
| B | −6.03510E−08 | 1.32515E−08 |
| C | 3.97207E−10 | 1.07342E−10 |
| D | −1.64571E−12 | −1.35072E−13 |
| E | 3.67325E−15 | |

Table 3 below illustrates focal lengths f, F numbers Fno, and angles of view 2ω in a wide-angle end state, an intermediate focal length state, and a telephoto end state of numerical value embodiment 1.

TABLE 3

| | Wide-angle end | Intermediate focal length | Telephoto end |
|---|---|---|---|
| f | 16.48 | 28.28 | 48.50 |
| Fno | 2.89 | 2.89 | 2.89 |
| 2ω | 85.5 | 54.3 | 33.0 |

In the zoom lens 1, magnification is changed between the wide-angle end state and the intermediate focal length state, resulting in a change in a surface interval D6 between the first lens group GR1 and the second lens group GR2, a surface interval D17 between the second lens group GR2 and the aperture stop S, a surface interval D24 between the third lens group GR3 and the fourth lens group GR4, and the back focus BF. Table 4 below illustrates variable intervals in the wide-angle end state, the intermediate focal length state, and the telephoto end state of each surface interval in numerical value embodiment 1.

TABLE 4

|  | Wide-angle end | Intermediate focal length | Telephoto end |
|---|---|---|---|
| D5 | 2.43 | 14.09 | 25.76 |
| D15 | 13.35 | 6.08 | 1.10 |
| D22 | 7.54 | 3.11 | 1.00 |
| BF | 37.34 | 47.98 | 59.87 |

FIG. 3 to FIG. 5 illustrate aberrations in an infinite focusing state of numerical value embodiment 1, wherein FIG. 3 illustrates aberrations in the wide-angle end state, FIG. 4 illustrates aberrations in the intermediate focal length state, and FIG. 5 illustrates aberrations in the telephoto end state.

In FIG. 3 to FIG. 5, in astigmatism diagrams, values on a sagittal image surface are indicated by solid lines, and values on a meridional image surface are indicated by broken lines.

As apparent from each aberration diagram, all aberrations are successfully corrected and superior image forming performance is achieved in numerical value embodiment 1.

<Second Embodiment>

FIG. 6 illustrates the lens configuration of the zoom lens 2 according to the second embodiment of the present technology.

In the zoom lens 2, the first lens group GR1 having positive refractive power, the second lens group GR2 having negative refractive power, the third lens group GR3 having positive refractive power, and the fourth lens group GR4 having positive refractive power are arranged in order from an object side to an image side.

The zoom lens 2 has a variable power ratio of 2.94.

The first lens group GR1 has a configuration in which a cemented lens, which is formed by joining a meniscus negative lens G1, whose convex surface faces the object side, to a meniscus positive lens G2, whose convex surface faces the object side, and a meniscus positive lens G3, whose convex surface faces the object side, are arranged in order from the object side to the image side.

The second lens group GR2 has a configuration in which a meniscus negative lens G4, whose convex surface faces the object side, a biconcave negative lens G5, a biconvex positive lens G6, and a cemented lens, which is formed by joining a biconcave negative lens G7 to a biconvex positive lens G8, are arranged in order from the object side to the image side. The negative lens G4 has a compound aspherical surface.

The third lens group GR3 has a configuration in which a biconvex positive lens G9, a meniscus positive lens G10, whose convex surface faces the object side, and a biconcave negative lens G11 are arranged in order from the object side to the image side.

The fourth lens group GR4 has a configuration in which a biconvex positive lens G12, a biconcave negative lens G13, a cemented lens formed by joining a biconcave negative lens G14 to a biconvex positive lens G15, and a biconvex positive lens G15 are arranged in order from the object side to the image side. The negative lens G13 has a compound aspherical surface.

A filter (not illustrated) and a cover glass (not illustrated) are arranged in order from the object side to the image side between the fourth lens group GR4 and an image surface IMG.

An aperture stop S is arranged adjacent to the object side of the third lens group GR3 between the second lens group GR2 and the third lens group GR3, and moves together with the third lens group GR3.

Table 5 below illustrates lens data of numerical value embodiment 2 in which detailed numerical values are applied to the zoom lens 2 according to the second embodiment.

TABLE 5

| Si | Ri | Di | Nd | vd |
|---|---|---|---|---|
| 1 | 248.293 | 1.50 | 1.84666 | 23.78 |
| 2 | 77.442 | 6.35 | 1.77250 | 49.62 |
| 3 | 828.406 | 0.15 |  |  |
| 4 | 45.449 | 5.21 | 1.77250 | 49.62 |
| 5 | 110.351 | (D5) |  |  |
| 6 (ASP) | 113.927 | 0.20 | 1.53420 | 41.73 |
| 7 | 56.745 | 0.90 | 1.88300 | 40.8 |
| 8 | 14.097 | 7.45 |  |  |
| 9 | −69.990 | 1.00 | 1.88300 | 40.8 |
| 10 | 40.222 | 0.30 |  |  |
| 11 | 32.926 | 4.50 | 1.68893 | 31.16 |
| 12 | −45.389 | 2.20 |  |  |
| 13 | −17.971 | 0.90 | 1.69680 | 55.46 |
| 14 | 45.827 | 2.91 | 1.84666 | 23.78 |
| 15 | −80.002 | (D15) |  |  |
| 16 | inf | 1.50 |  |  |
| 17 | 46.571 | 4.71 | 1.67003 | 47.2 |
| 18 | −39.402 | 0.20 |  |  |
| 19 | 30.784 | 3.77 | 1.49700 | 81.61 |
| 20 | 428.374 | 2.65 |  |  |
| 21 | −34.230 | 1.00 | 1.88300 | 40.8 |
| 22 | 100.000 | (D22) |  |  |
| 23 | 32.526 | 6.30 | 1.49700 | 81.61 |
| 24 | −37.540 | 1.03 |  |  |
| 25 | −840.729 | 2.00 | 1.84666 | 23.78 |
| 26 | 80.000 | 0.30 | 1.53420 | 41.73 |
| 27 (ASP) | 368.156 | 2.14 |  |  |
| 28 | −61.840 | 0.90 | 1.90366 | 31.31 |
| 29 | 43.876 | 5.79 | 1.48749 | 70.44 |
| 30 | −42.016 | 1.00 |  |  |
| 31 | 220.022 | 4.10 | 1.74400 | 44.72 |
| 32 | −35.281 | (BF) |  |  |

In the zoom lens 2, surfaces (sixth surfaces) of the negative lens G4 of the second lens group GR2, which face the object side, and surfaces (twenty-seventh surfaces) of the negative lens G13 of the fourth lens group GR4, which face the image side, are aspherical surfaces. In numerical value embodiment 2, Table 6 below illustrates the fourth, sixth, eighth, tenth, and twelfth order aspheric coefficients A, B, C, D, and E of aspherical surfaces together with the conic constant κ.

TABLE 6

|  | S6 | S27 |
|---|---|---|
| κ | 0.00000E+00 | 0.00000E+00 |
| A | 2.35434E−05 | 3.09658E−05 |
| B | −3.61352E−08 | 9.09172E−09 |
| C | 3.41749E−11 | 2.01951E−12 |
| D | 1.60056E−13 | 1.25710E−13 |
| E | −8.80277E−17 |  |

Table 7 below illustrates focal lengths f, F numbers Fno, and angles of view 2ω in a wide-angle end state, an intermediate focal length state, and a telephoto end state of numerical value embodiment 2.

TABLE 7

|  | Wide-angle end | Intermediate focal length | Telephoto end |
|---|---|---|---|
| f | 16.48 | 28.28 | 48.50 |
| Fno | 2.88 | 2.88 | 2.88 |
| 2ω | 84.3 | 54.2 | 33.0 |

In the zoom lens 2, magnification is changed between the wide-angle end state and the intermediate focal length state, resulting in a change in a surface interval D6 between the first lens group GR1 and the second lens group GR2, a surface interval D17 between the second lens group GR2 and the aperture stop S, a surface interval D24 between the third lens group GR3 and the fourth lens group GR4, and the back focus BF. Table 8 below illustrates variable intervals in the wide-angle end state, the intermediate focal length state, and the telephoto end state of each surface interval in numerical value embodiment 2.

TABLE 8

|  | Wide-angle end | Intermediate focal length | Telephoto end |
|---|---|---|---|
| D5 | 2.25 | 13.39 | 24.98 |
| D15 | 13.59 | 5.88 | 1.00 |
| D22 | 7.37 | 3.04 | 1.00 |
| BF | 37.34 | 49.31 | 62.35 |

FIG. 7 to FIG. 9 illustrate aberrations in an infinite focusing state of numerical value embodiment 2, wherein FIG. 7 illustrates aberrations in the wide-angle end state, FIG. 8 illustrates aberrations in the intermediate focal length state, and FIG. 9 illustrates aberrations in the telephoto end state.

In FIG. 7 to FIG. 9, in astigmatism diagrams, values on a sagittal image surface are indicated by solid lines, and values on a meridional image surface are indicated by broken lines.

As apparent from each aberration diagram, all aberrations are successfully corrected and superior image forming performance is achieved in numerical value embodiment 2.

[Values of Conditional Expressions of Zoom Lens]

Hereinafter, values of conditional expressions of the zoom lens of the present technology will be described.

Table 9 below illustrates values of conditional expression (1) to conditional expression (6) in the zoom lens 1 and the zoom lens 2.

TABLE 9

|  |  | Zoom lens 1 | Zoom lens 2 |
|---|---|---|---|
|  | fw12 | −17.020 | −16.000 |
|  | fw | 16.48 | 16.48 |
| Conditional expression (1) | $0.95 < |fw12|/fw < 1.2$ | 1.03 | 0.97 |
|  | f1 | 84.11 | 84.68 |
|  | βt234 | 0.58 | 0.57 |
| Conditional expression (2) | $140 < f1/βt234 < 150$ | 145.9 | 147.8 |
| Conditional expression (3) | $Nd1 > 1.75$ | 1.80420 | 1.77250 |
|  | TL3 | 11.60 | 12.33 |
|  | TLw | 130.11 | 131.52 |
| Conditional expression (4) | $TL3/TLw < 0.095$ | 0.089 | 0.094 |
|  | R3r | 43.518 | 100.000 |
|  | R4f | 26.197 | 32.526 |
| Conditional expression (5) | $0.0 < (R3r − R4f)/(R3r + R4f) < 0.55$ | 0.25 | 0.51 |
|  | βw34 | −0.97 | −1.03 |

TABLE 9-continued

|  |  | Zoom lens 1 | Zoom lens 2 |
|---|---|---|---|
| Conditional expression (6) | $4 \leq 2 − βw34 − 1/βw34 < 4.1$ | 4.00 | 4.00 |

As apparent from Table 9 above, the zoom lens 1 and the zoom lens 2 are configured to satisfy conditional expression (1) to conditional expression (6).

[Configuration of Imaging Apparatus]

The imaging apparatus of the present technology includes a zoom lens, and an imaging element configured to convert an optical image formed by the zoom lens into an electrical signal, wherein the zoom lens includes a first lens group having positive refractive power, a second lens group having negative refractive power, a third lens group having positive refractive power, and a fourth lens group having positive refractive power, which are arranged in order from an object side.

Furthermore, according to the zoom lens of the imaging apparatus of the present technology, when a positional state of a lens is changed from a wide-angle end to a telephoto end, an interval between the first lens group and the second lens group is increased, an interval between the second lens group and the third lens group is decreased, an interval between the third lens group and the fourth lens group is decreased, an aperture stop is arranged between the second lens group and the third lens group, and the second lens group moves to close range focusing.

According to the zoom lens of the imaging apparatus of the present technology, in the wide-angle end state, since the first lens group and the second lens group are arranged adjacent to each other and a synthetic focal length of the two lens groups has a negative value, it is possible to regard the first lens group and the second lens group as one negative lens group. In the same manner, since both the third lens group and the fourth lens group are positive lens groups and a synthetic focal length of the two lens groups has a positive value, it is possible to regard the third lens group and the fourth lens group as one positive lens group.

Thus, the zoom lens of the imaging apparatus of the present technology is a negative•positive retrofocus type zoom lens in which lens groups are arranged in order from an object side to an image side in the wide-angle end state, and has a configuration optimal to a wide angle of view. Furthermore, in the wide-angle end state, the interval between the second lens group and the third lens group is increased, so that an off-axis light flux passing through the second lens group passes through a place separated from an optical axis, and thus it is possible to correct an on-axis light flux independent of the off-axis light flux.

According to the zoom lens of the imaging apparatus of the present technology, in the telephoto end state, the interval between the first lens group and the second lens group is increased. Furthermore, in the telephoto end state, the interval between the second lens group and the third lens group and the interval between the third lens group and the fourth lens group are reduced, so that the second lens group, the third lens group, and the fourth lens group are adjacent to one another. Since a synthetic focal length of the three lens groups has a positive value, it is possible to regard the second lens group, the third lens group, and the fourth lens group as one positive lens group.

Thus, the zoom lens of the imaging apparatus of the present technology has a positive•positive group configuration in which lens groups are arranged in order from the object side to the image side in the telephoto end state, and has a group configuration suitable when the telephoto end is approximate to a standard angle of view.

Furthermore, in the telephoto end state, since the interval between the second lens group and the third lens group is reduced, the off-axis light flux passing through the second lens group passes through a place adjacent to the optical axis.

As described above, the refractive power arrangement of each group and a change in the lens position are optimized, so that it is possible to achieve a desired optical system. Furthermore, the height of the off-axis light flux passing through the second lens group is changed, so that off-axis aberration occurring due to a change in the lens position is successfully corrected. In the imaging apparatus of the present technology, specifically, the configuration of the second lens group of the zoom lens is important for aberration correction.

The zoom lens of the imaging apparatus of the present technology is configured to satisfy conditional expression (1) and conditional expression (2) below.

$$0.95 < |fw12|/fw < 1.2 \quad (1)$$

$$140 < f1/\beta t234 < 150 \quad (2)$$

In conditional expression (1) and conditional expression (2), fw12 denotes the synthetic focal length of the first lens group and the second lens group at the wide-angle end, fw denotes a focal length of the whole lens system at the wide-angle end, f1 denotes the focal length of the first lens group, and βt234 denotes the synthetic magnification of the second lens group, the third lens group, and the fourth lens group at the telephoto end.

Conditional expression (1) relates to the synthetic focal length of the first lens group and the second lens group at the wide-angle end with respect to the focal length of the whole lens system at the wide-angle end.

If the lower limit of conditional expression (1) is not reached, the synthesized refractive power of the first lens group and the second lens group at the wide-angle end is increased, so that it is possible to reduce the diameter of an optical filter and the total optical length. However, comma aberration may be increased or eccentricity sensitivity may be increased.

Meanwhile, if the upper limit of conditional expression (1) is reached, the synthesized refractive power of the first lens group and the second lens group at the wide-angle end is reduced, so that the diameter of the optical filter may be increased and the total optical length may be increased.

Consequently, the zoom lens satisfies conditional expression (1), so that the synthesized refractive power of the first lens group and the second lens group at the wide-angle end is made appropriate, and thus it is possible to reduce the diameter of the optical filter and the total optical length and to decrease comma aberration or eccentricity sensitivity.

Conditional expression (2) defines the ratio of the focal length at the telephoto end with respect to the synthetic magnification of the second lens group, the third lens group, and the fourth lens group.

If the lower limit of conditional expression (2) is not reached, since the refractive power of the first lens group is increased or the synthetic magnification of the second lens group, the third lens group, and the fourth lens group at the telephoto end is increased, eccentricity sensitivity may be increased and optical performance may be significantly reduced due to mutual eccentricity occurring at the time of manufacturing.

Meanwhile, if the upper limit of conditional expression (2) is reached, since the refractive power of the first lens group at the telephoto end is reduced or the synthetic magnification of the second lens group, the third lens group, and the fourth lens group at the telephoto end is reduced, a problem may occur in optical specifications, for example, the diameter of the first lens group may be increased, or it may not be possible to ensure a focal length required at the telephoto end.

Consequently, the zoom lens satisfies conditional expression (2), so that the synthetic magnification of the second lens group, the third lens group, and the fourth lens group at the telephoto end is made appropriate, and thus it is possible to improve optical performance through a reduction of eccentricity sensitivity and to reduce the diameter of the first lens group.

[Embodiment of Imaging Apparatus]

FIG. 10 is a block diagram of a digital still camera according to an embodiment of an imaging apparatus of the present technology.

An imaging apparatus (a digital still camera) 100 includes a camera block 10 having an imaging function, a camera signal processing unit 20 configured to perform signal processing such as analog-digital conversion of a photographed image signal, and an image processing unit 30 configured to perform a recording/reproducing process of an image signal. Furthermore, the imaging apparatus 100 includes a liquid crystal display (LCD) 40 configured to display a photographed image and the like, a reader/writer (R/W) 50 configured to perform write/read of an image signal to/from a memory card 1000, a central processing unit (CPU) 60 configured to control the entire imaging apparatus, an input unit 70 having various switches and the like for which a predetermined operation is performed by a user, and a lens driving control unit 80 configured to control the driving of lenses arranged in the camera block 10.

The camera block 10 includes an optical system having zoom lenses 11 (the zoom lens 1 and the zoom lens 2 to which the present technology is applied), an imaging element 12 such as a charge coupled device (CCD) or a complementary metal-oxide semiconductor (CMOS), and the like.

The camera signal processing unit 20 is configured for various types of signal processing such as conversion to a digital signal, noise removal, image quality correction, or conversion to a luminance•color difference signal with respect to an output signal from the imaging element 12.

The image processing unit 30 is configured to perform a compression encoding•extension decoding process, or a conversion process of data specifications, which includes resolution and the like, with respect to an image signal based on a predetermined image data format.

The LCD 40 has a function of displaying an operation state of the input unit 70 by a user, or various pieces of data such as a photographed image.

The R/W 50 is configured to write image data encoded by the image processing unit 30 to the memory card 1000, or read image data recorded on the memory card 1000.

The CPU 60 serves as a control processing unit for controlling each circuit block provided in the imaging apparatus 100, and is configured to control each circuit block based on an instruction input signal and the like from the input unit 70.

The input unit 70, for example, includes a shutter release button for performing a shutter operation, a selection switch for selecting an operation mode, and the like, and is configured to output the instruction input signal corresponding to an operation of a user to the CPU 60.

The lens driving control unit 80 is configured to control a motor (not illustrated) and the like for driving each lens of the zoom lens 11 based on a control signal from the CPU 60.

The memory card 1000, for example, includes a semiconductor memory attachable/detachable to/from a slot connected to the R/W 50.

Hereinafter, the operation of the imaging apparatus 100 will be described.

In a photographing standby state, an image signal photographed in the camera block 10 is output to the LCD 40 through the camera signal processing unit 20, and is displayed as a camera's live view image under the control of the CPU 60. Furthermore, if an instruction input signal for zooming is input from the input unit 70, the CPU 60 outputs a control signal to the lens driving control unit 80, and a predetermined lens of the zoom lens 11 is moved based on the control of the lens driving control unit 80.

If a shutter (not illustrated) of the camera block 10 is operated by the instruction input signal from the input unit 70, a photographed image signal is output from the camera signal processing unit 20 to the image processing unit 30, is subject to the compression encoding process, and is converted into digital data having a predetermined data format. The converted data is output to the R/W 50 and is written in the memory card 1000.

For example, when the shutter release button of the input unit 70 is half pressed or fully pressed for recording (photographing), the lens driving control unit 80 moves a predetermined lens of the zoom lens 11 based on the control signal from the CPU 60, resulting in the achievement of focusing.

When image data recorded on the memory card 1000 is reproduced, predetermined image data is read from the memory card 1000 by the R/W 50 according to an operation of the input unit 70, and is subject to the extension decoding process by the image processing unit 30. Then, a reproduction image signal is output to the LCD 40, resulting in the display of a reproduction image.

In the above-mentioned embodiments, the example in which the imaging apparatus is applied to a digital still camera has been described. However, the application range of the imaging apparatus is not limited to the digital still camera. For example, the imaging apparatus can be widely applied as a camera unit and the like of digital input/output equipment such as a digital video camera, a cellular phone provided with a camera, or a personal digital assistant (PDA) provided with a camera.

[Present Technology]

Additionally, the present technology may also be configured as below.

(1)

A zoom lens including:
a first lens group having positive refractive power;
a second lens group having negative refractive power;
a third lens group having positive refractive power; and
a fourth lens group having positive refractive power, the first lens group, the second lens group, the third lens group, and the fourth lens group being arranged in order from an object side,
wherein, when a positional state of a lens is changed from a wide-angle end to a telephoto end, an interval between the first lens group and the second lens group is increased, an interval between the second lens group and the third lens group is decreased, an interval between the third lens group and the fourth lens group is decreased, an aperture stop is arranged between the second lens group and the third lens group, and the second lens group moves in close range focusing, and the zoom lens satisfies conditional expression (1) and conditional expression (2) below, $$0.95 < |fw12|/fw < 1.2 \quad (1)$$

$$140 < f1/\beta t234 < 150 \quad (2)$$

where, in conditional expression (1) and conditional expression (2), fw12 denotes a synthetic focal length of the first lens group and the second lens group at a wide-angle end, fw denotes a focal length of a whole lens system at the wide-angle end, f1 denotes a focal length of the first lens group, and βt234 denotes synthetic magnification of the second lens group, the third lens group, and the fourth lens group at a telephoto end.

(2)

The zoom lens according to (1), wherein the first lens group includes one negative lens and two positive lenses, and the zoom lens satisfies conditional expression (3) below, $$Nd1 > 1.75 \quad (3)$$

where, in conditional expression (3), Nd1 denotes a refractive index of the two positive lenses of the first lens group.

(3)

The zoom lens according to (1) or (2), wherein the third lens group includes a positive lens, a positive lens, and a negative lens, which are arranged in order from the object side, and the zoom lens satisfies conditional expression (4) below, $$TL3/TLw < 0.095 \quad (4)$$

where, in conditional expression (4), TL3 denotes a thickness of the third lens group, and TLw denotes a total optical length at the wide-angle end.

(4)

The zoom lens according to any one of (1) or (3), wherein the zoom lens satisfies conditional expression (5) below, $$0.0 < (R3r - R4f)/(R3r + R4f) < 0.55 \quad (5)$$

where, in conditional expression (5), R3r denotes a curvature radius of a surface facing an image side and arranged nearest the image side in the third lens group, and R4f denotes a curvature radius of a surface facing the object side and arranged nearest the object side in the fourth lens group.

(5)

The zoom lens according to any one of (1) to (4), wherein the zoom lens satisfies conditional expression (6) below, $$4 \leq 2 - \beta w34 - 1/\beta w34 < 4.1 \quad (6)$$

where, in conditional expression (6), βw34 denotes synthetic magnification of the third lens group and the fourth lens group at the wide-angle end.

(6)

An imaging apparatus including:
a zoom lens; and
an imaging element configured to convert an optical image formed by the zoom lens into an electrical signal,
wherein the zoom lens comprises:
a first lens group having positive refractive power;
a second lens group having negative refractive power;
a third lens group having positive refractive power; and
a fourth lens group having positive refractive power, the first lens group, the second lens group, the third lens group, and the fourth lens group being arranged in order from an object side,
wherein, when a positional state of a lens is changed from a wide-angle end to a telephoto end, an interval between the first lens group and the second lens group is increased, an interval between the second lens group and the third lens group is decreased, an interval between the third lens group and the fourth lens group is decreased, an aperture stop is arranged between the second lens group and the third lens group, and the second lens group moves to close range focusing, and the zoom lens satisfies conditional expression (1) and conditional expression (2) below, $$0.95<|fw12|/fw<1.2 \tag{1}$$

$$140<f1/\beta t234<150 \tag{2}$$

where, in conditional expression (1) and conditional expression (2), fw12 denotes a synthetic focal length of the first lens group and the second lens group at a wide-angle end, fw denotes a focal length of a whole lens system at the wide-angle end, f1 denotes a focal length of the first lens group, and βt234 denotes synthetic magnification of the second lens group, the third lens group, and the fourth lens group at a telephoto end.

The shape and numerical value of each element in the above-mentioned embodiments are only an example of an embodiment for carrying out the present technology, and it should be noted that the technical scope of the present technology is not construed in a manner limited by these embodiments.

BRIEF DESCRIPTION OF THE DRAWINGS

FIG. 10 is a block diagram illustrating an example of an imaging apparatus.

Figure 1:
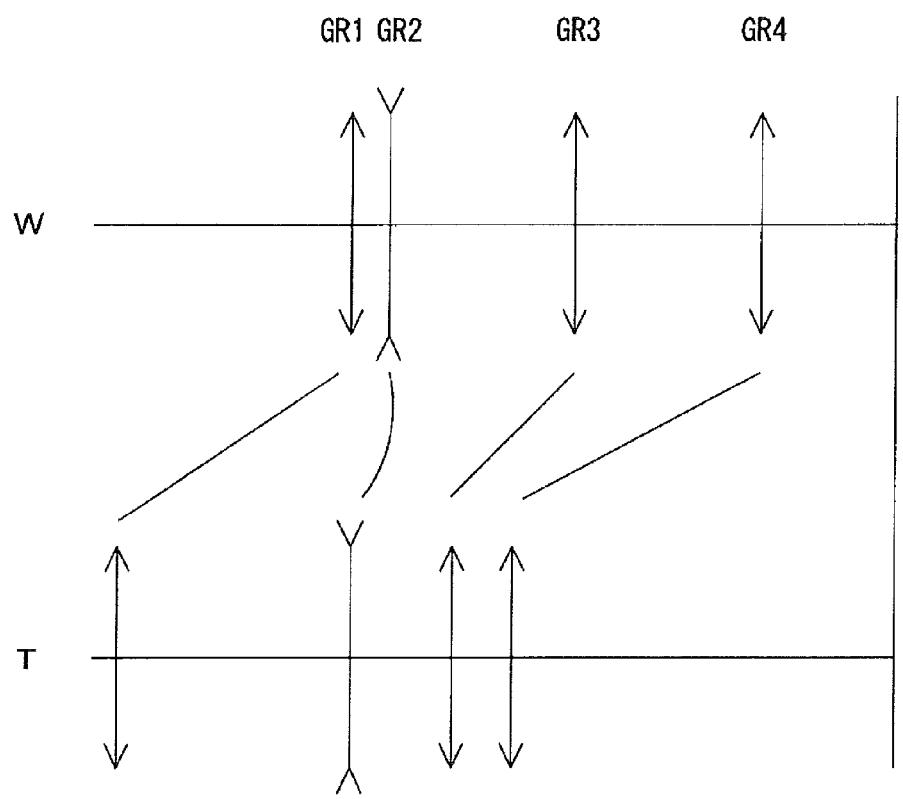
FIG. 1 illustrates a preferred embodiment for embodying a zoom lens of the present technology together with FIG. 2 to FIG. 10, and is a diagram illustrating refractive power distribution.
Figure 2:
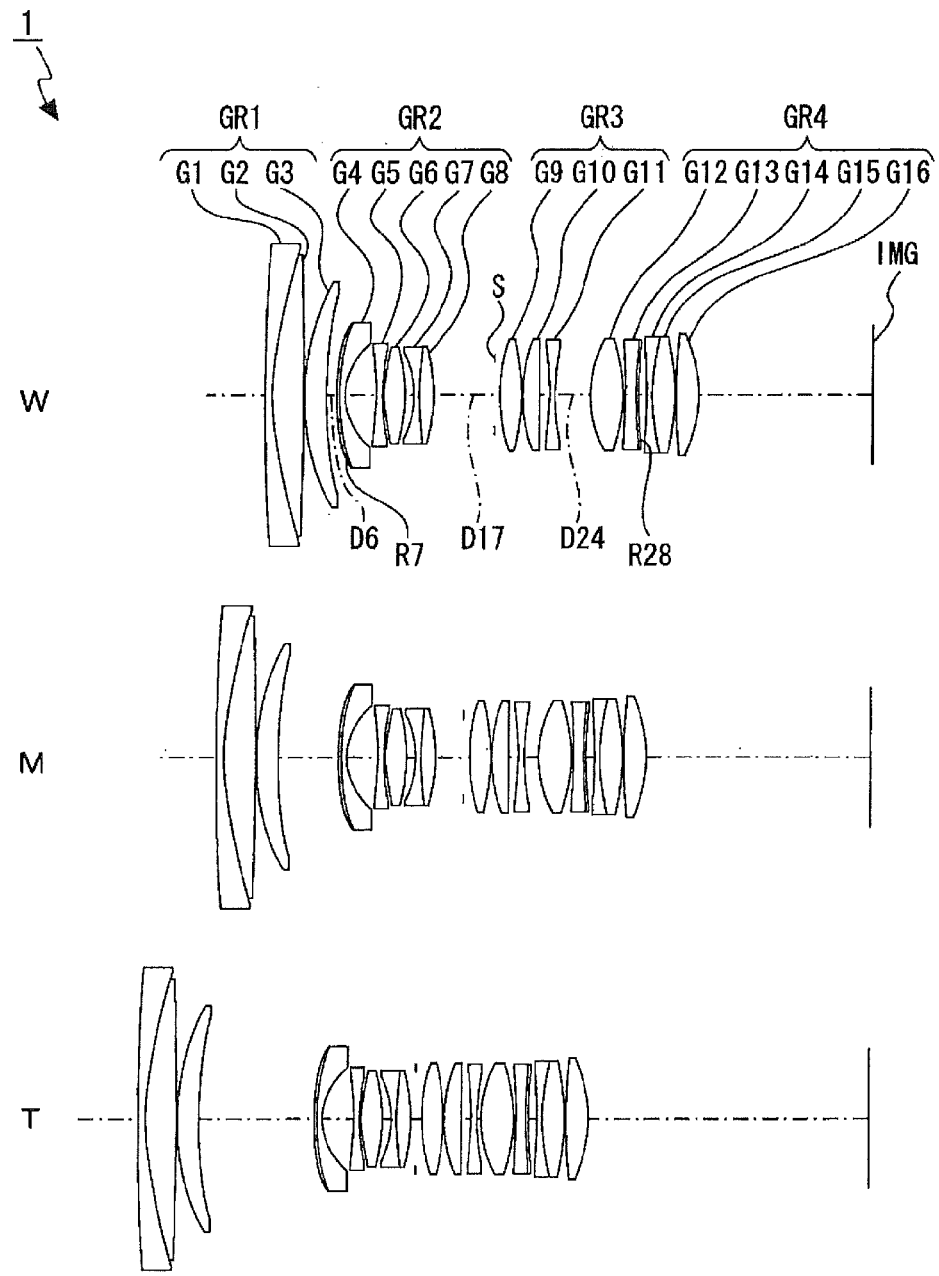
FIG. 2 is a diagram illustrating the lens configuration of a zoom lens according to a first embodiment.
Figure 3:
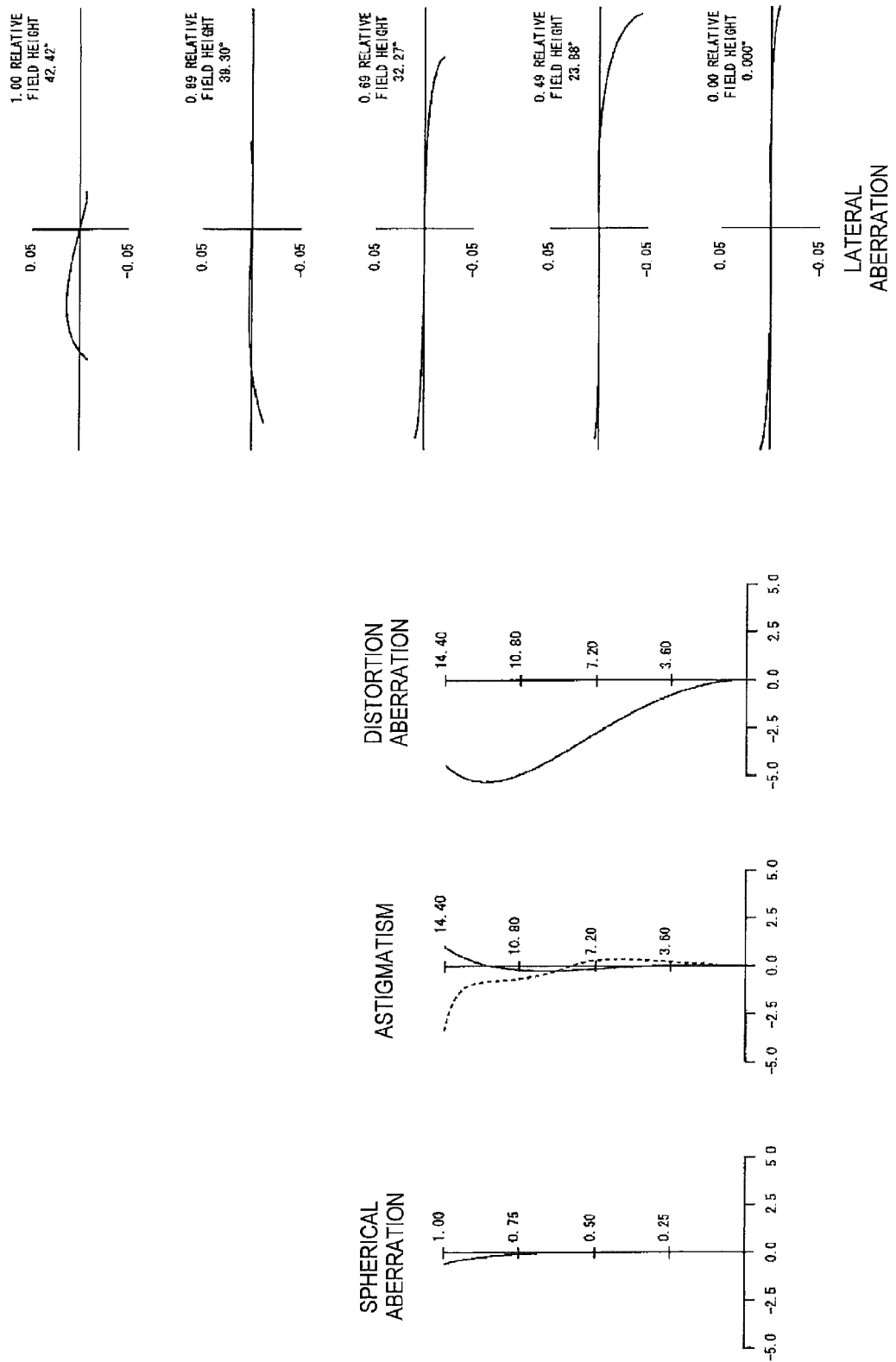
FIG. 3 is a diagram illustrating aberrations of a numerical value embodiment in which detailed numerical values are applied to a first embodiment, together with FIG. 4 and FIG. 5, and is a diagram illustrating spherical aberration, astigmatism, distortion aberration, and lateral aberration in a wide-angle state.
Figure 4:
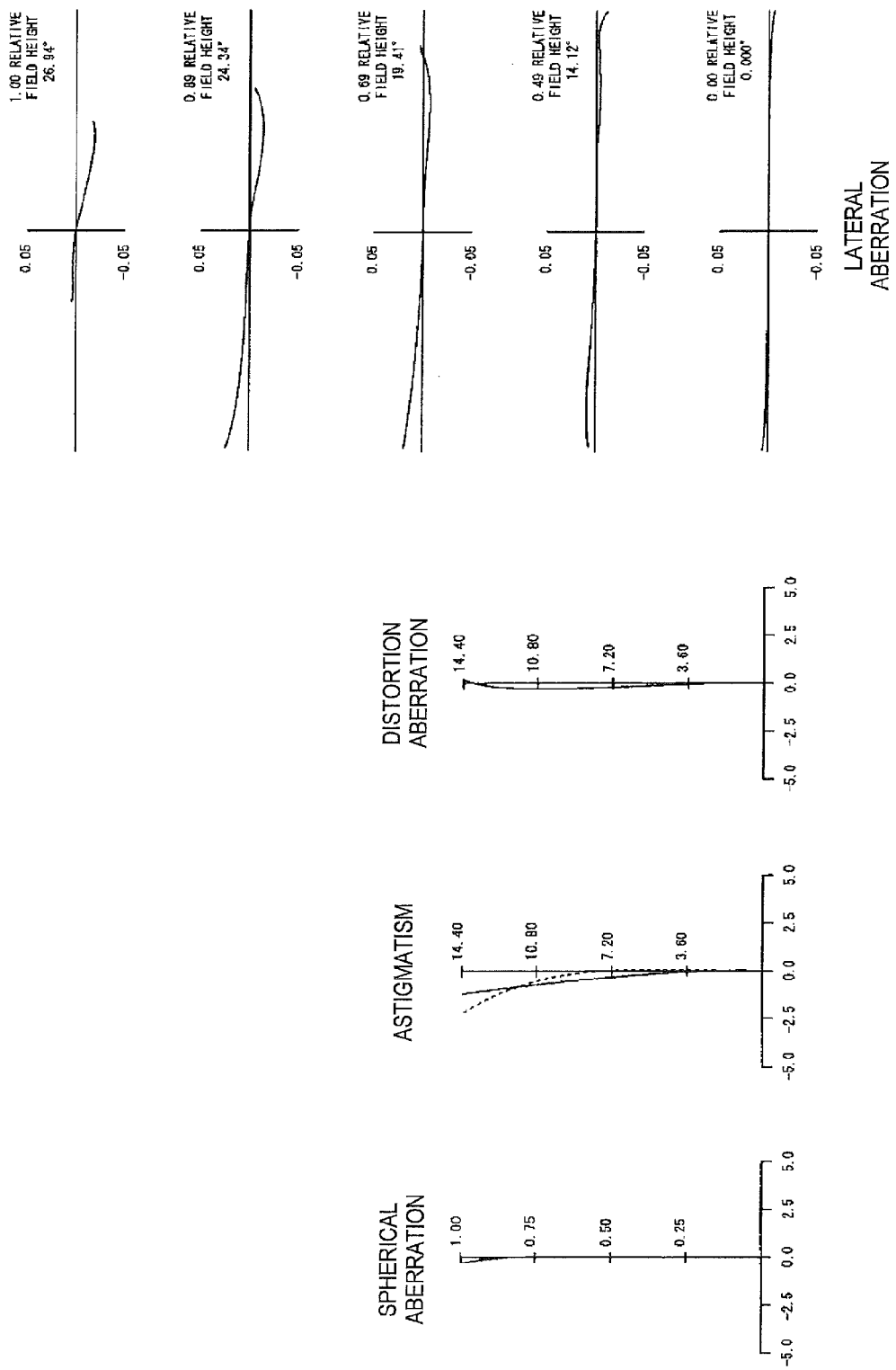
FIG. 4 is a diagram illustrating spherical aberration, astigmatism, distortion aberration, and lateral aberration in an intermediate focal length state.
Figure 5:
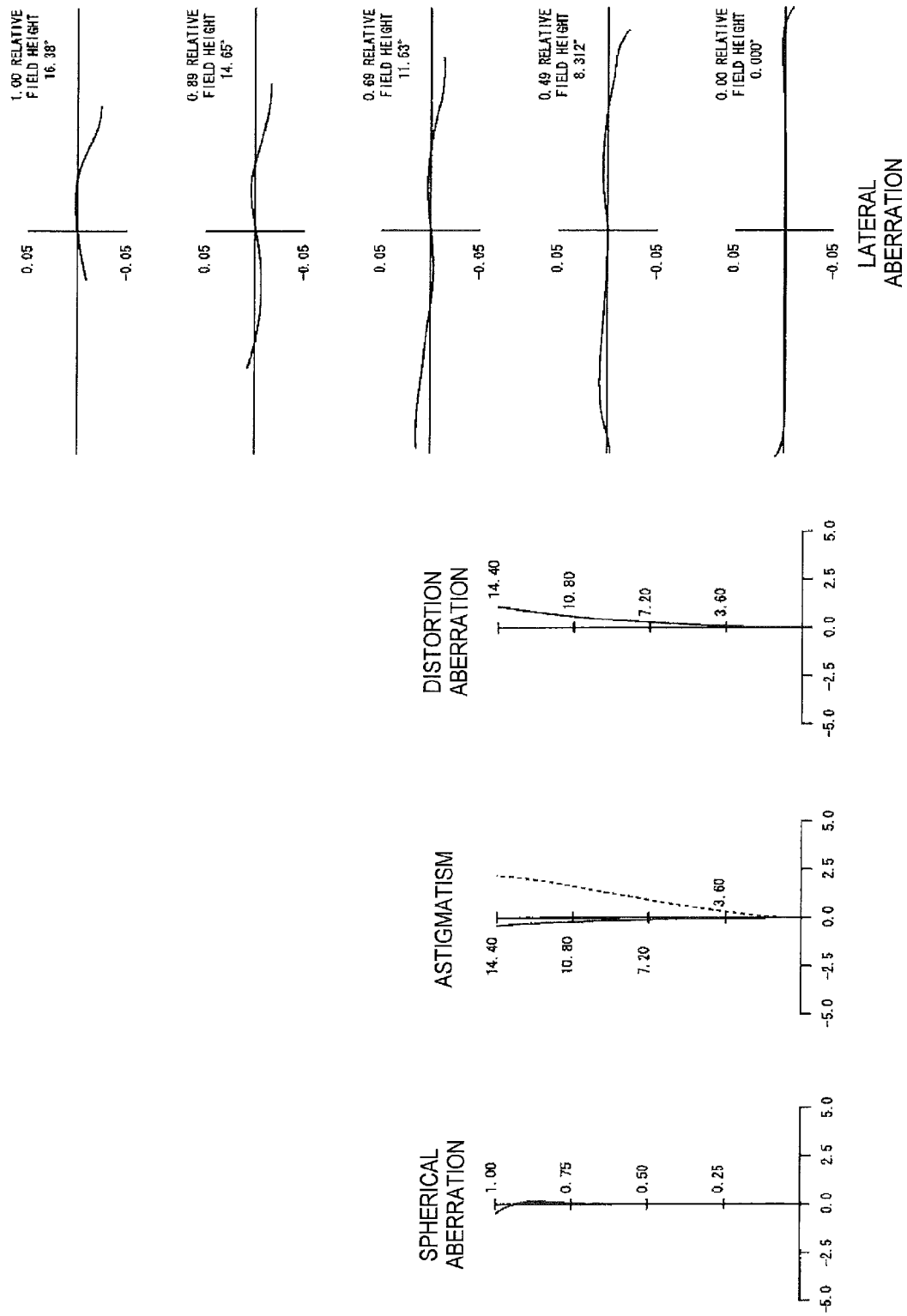
FIG. 5 is a diagram illustrating spherical aberration, astigmatism, distortion aberration, and lateral aberration in a telephoto end state.
Figure 6:
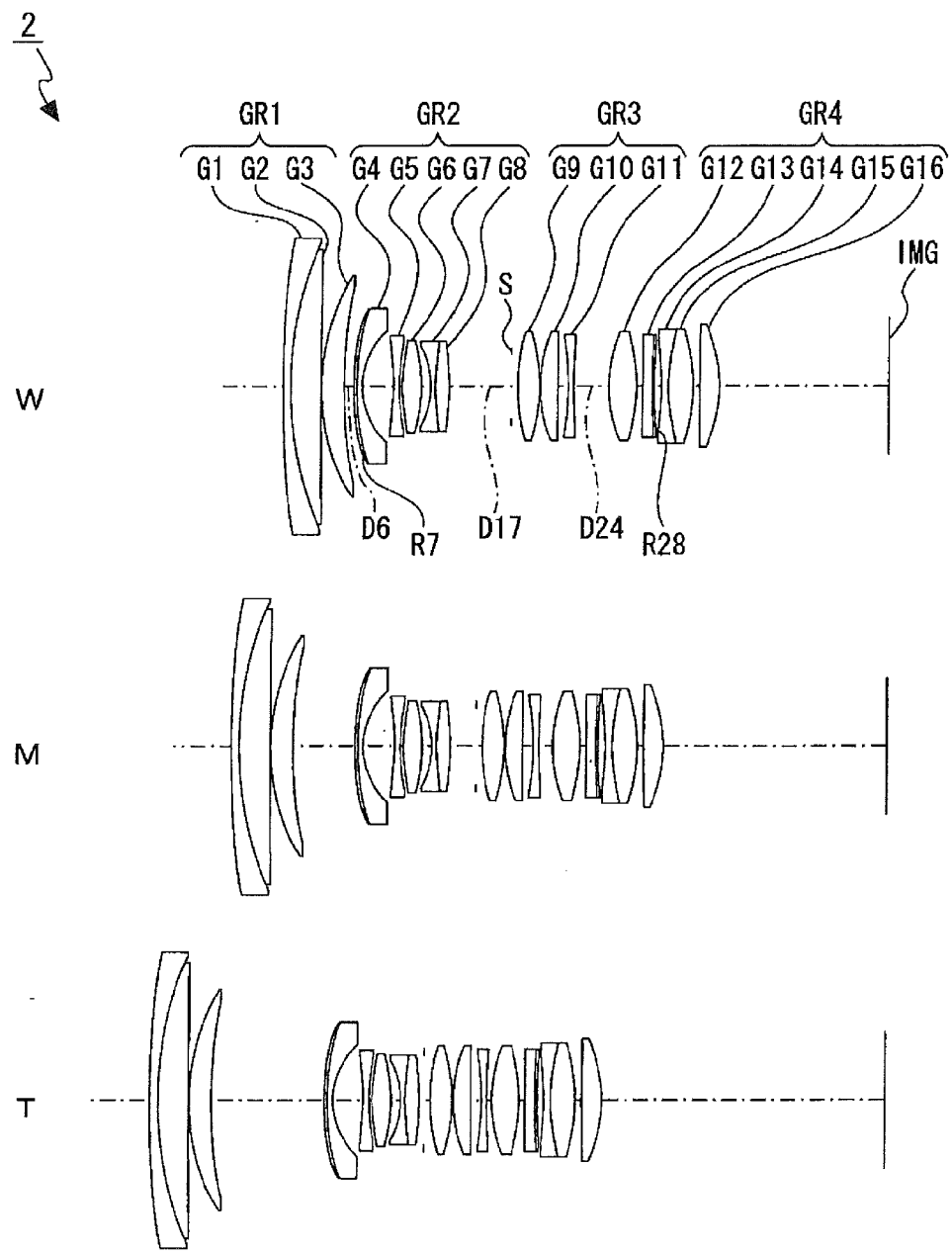
FIG. 6 is a diagram illustrating the lens configuration of a zoom lens according to a second embodiment.
Figure 7:
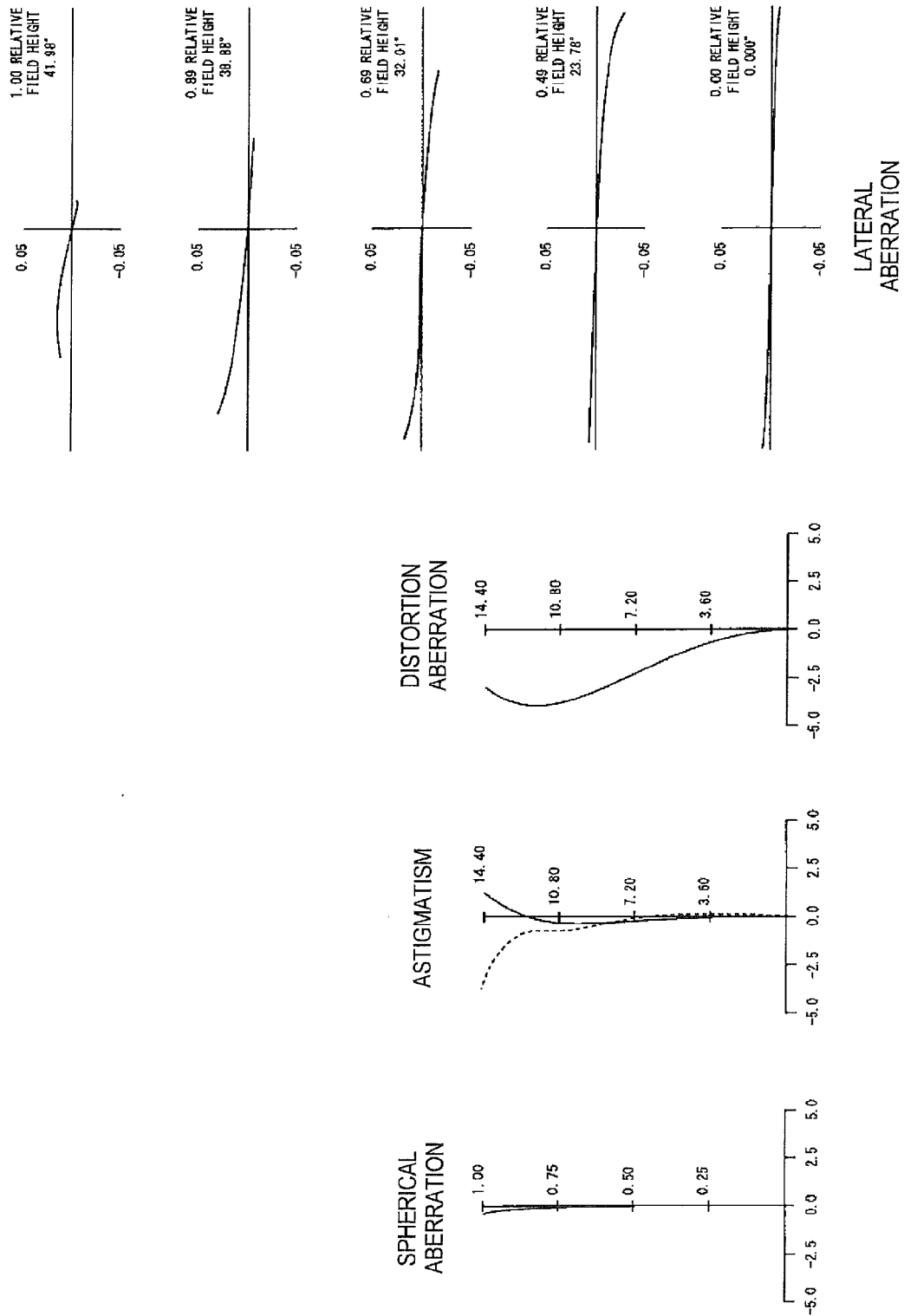
FIG. 7 is a diagram illustrating aberrations of a numerical value embodiment in which detailed numerical values are applied to a second embodiment, together with FIG. 8 and FIG. 9, and is a diagram illustrating spherical aberration, astigmatism, distortion aberration, and lateral aberration in a wide-angle state.
Figure 8:
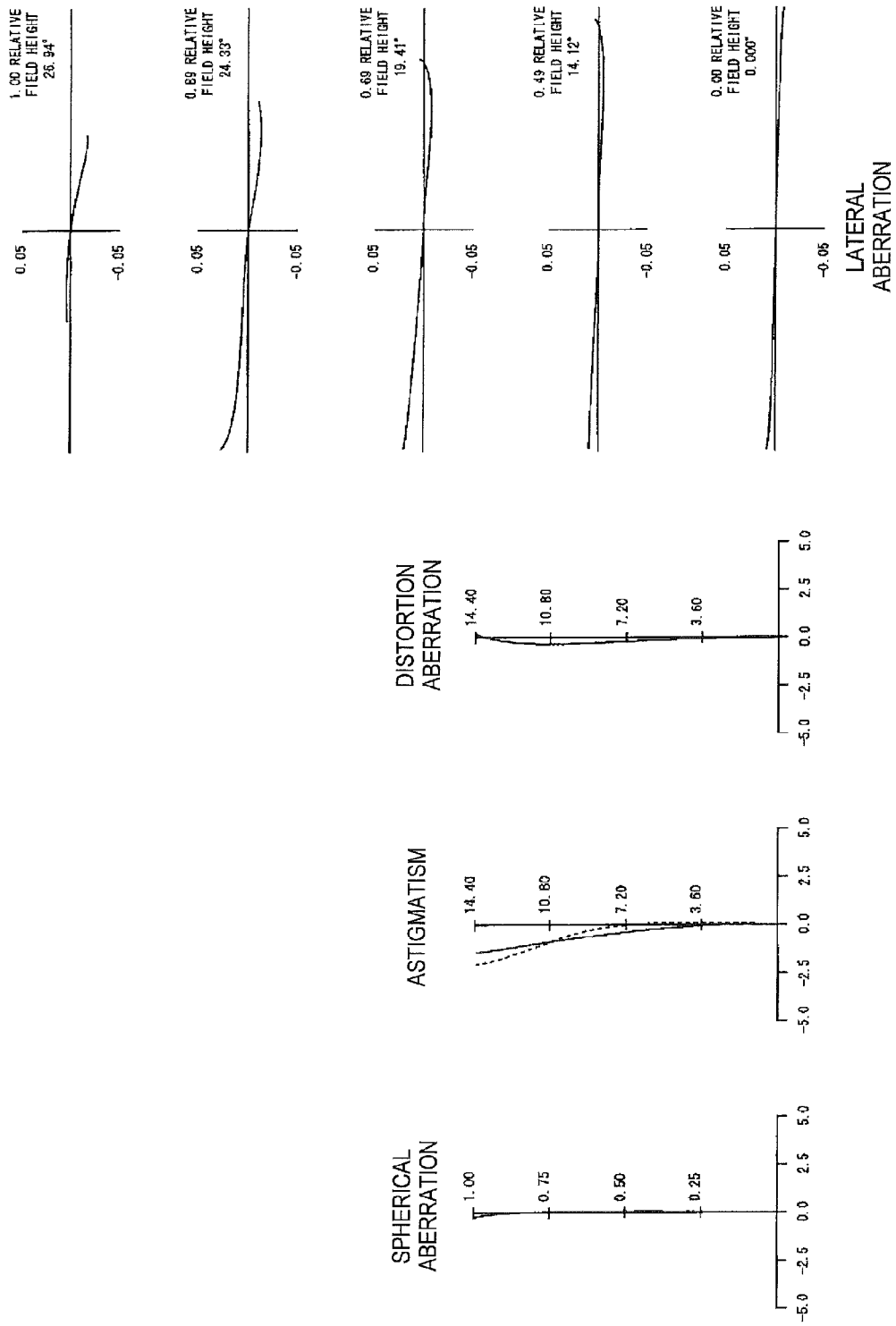
FIG. 8 is a diagram illustrating spherical aberration, astigmatism, distortion aberration, and lateral aberration in an intermediate focal length state.
Figure 9:
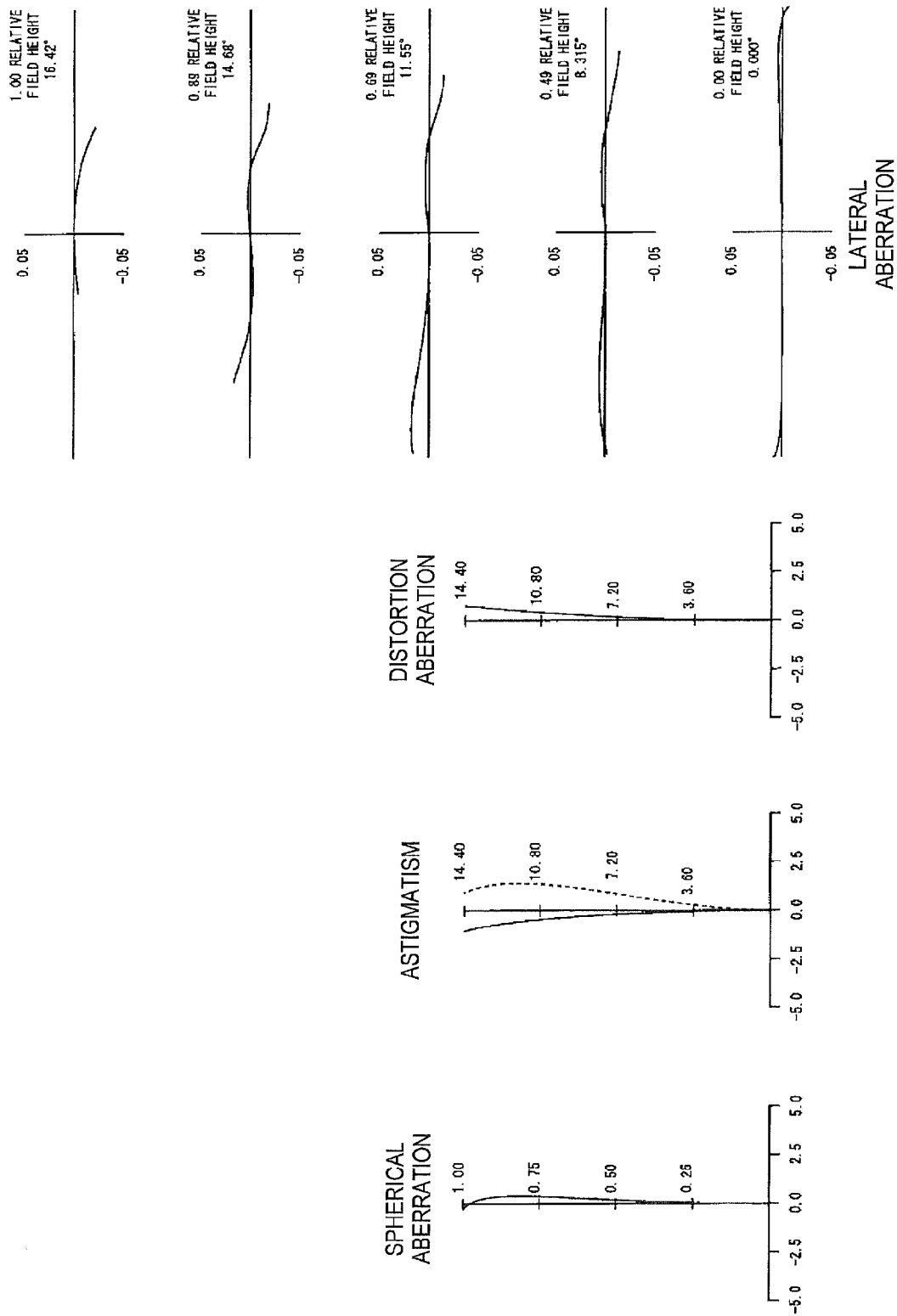
FIG. 9 is a diagram illustrating spherical aberration, astigmatism, distortion aberration, and lateral aberration in a telephoto end state.

It should be understood by those skilled in the art that various modifications, combinations, sub-combinations and alterations may occur depending on design requirements and other factors insofar as they are within the scope of the appended claims or the equivalents thereof.

The present technology contains subject matter related to that disclosed in Japanese Priority Patent Application JP 2011-126681 filed in the Japan Patent Office on Jun. 6, 2011, the entire content of which is hereby incorporated by reference.

What is claimed is:

1. A zoom lens comprising:
a first lens group having positive refractive power;
a second lens group having negative refractive power;
a third lens group having positive refractive power; and
a fourth lens group having positive refractive power, the first lens group, the second lens group, the third lens group, and the fourth lens group being arranged in order from an object side,
wherein, when a positional state of a lens is changed from a wide-angle end to a telephoto end, an interval between the first lens group and the second lens group is increased, an interval between the second lens group and the third lens group is decreased, an interval between the third lens group and the fourth lens group is decreased, an aperture stop is arranged between the second lens group and the third lens group, and the second lens group moves in close range focusing, and
the zoom lens satisfies conditional expression (1) and conditional expression (2) below, $$0.95<|fw12|/fw<1.2 \tag{1}$$

$$140<f1/\beta t234<150 \tag{2}$$

where, in conditional expression (1) and conditional expression (2), fw12 denotes a synthetic focal length of the first lens group and the second lens group at a wide-angle end, fw denotes a focal length of a whole lens system at the wide-angle end, f1 denotes a focal length of the first lens group, and βt234 denotes synthetic magnification of the second lens group, the third lens group, and the fourth lens group at a telephoto end.

2. The zoom lens according to claim 1, wherein the first lens group includes one negative lens and two positive lenses, and the zoom lens satisfies conditional expression (3) below, $$Nd1>1.75 \tag{3}$$

where, in conditional expression (3), Nd1 denotes a refractive index of the two positive lenses of the first lens group.

3. The zoom lens according to claim 1, wherein the third lens group includes a positive lens, a positive lens, and a negative lens, which are arranged in order from the object side, and the zoom lens satisfies conditional expression (4) below, $$TL3/TLw<0.095 \tag{4}$$

where, in conditional expression (4), TL3 denotes a thickness of the third lens group, and TLw denotes a total optical length at the wide-angle end.

4. The zoom lens according to claim 1, wherein the zoom lens satisfies conditional expression (5) below, $$0.0<(R3r-R4f)/(R3r+R4f)<0.55 \tag{5}$$

where, in conditional expression (5), R3r denotes a curvature radius of a surface facing an image side and arranged nearest the image side in the third lens group, and R4f denotes a curvature radius of a surface facing the object side and arranged nearest the object side in the fourth lens group.

5. The zoom lens according to claim 1, wherein the zoom lens satisfies conditional expression (6) below, $$4 \leq 2-\beta w34-1/\beta w34<4.1 \qquad (6)$$

where, in conditional expression (6), βw34 denotes synthetic magnification of the third lens group and the fourth lens group at the wide-angle end.

6. An imaging apparatus comprising:

a zoom lens; and an imaging element configured to convert an optical image formed by the zoom lens into an electrical signal, wherein the zoom lens comprises:

a first lens group having positive refractive power;

a second lens group having negative refractive power;

a third lens group having positive refractive power; and a fourth lens group having positive refractive power, the first lens group, the second lens group, the third lens group, and the fourth lens group being arranged in order from an object side, wherein, when a positional state of a lens is changed from a wide-angle end to a telephoto end, an interval between the first lens group and the second lens group is increased, an interval between the second lens group and the third lens group is decreased, an interval between the third lens group and the fourth lens group is decreased, an aperture stop is arranged between the second lens group and the third lens group, and the second lens group moves to close range focusing, and the zoom lens satisfies conditional expression (1) and conditional expression (2) below, $$0.95<|fw12|/fw<1.2 \qquad (1)$$

$$140<f1/\beta t234<150 \qquad (2)$$

where, in conditional expression (1) and conditional expression (2), fw12 denotes a synthetic focal length of the first lens group and the second lens group at a wide-angle end, fw denotes a focal length of a whole lens system at the wide-angle end, f1 denotes a focal length of the first lens group, and βt234 denotes synthetic magnification of the second lens group, the third lens group, and the fourth lens group at a telephoto end.

* * * * *